US006895464B2

(12) United States Patent
Chow et al.

(10) Patent No.: US 6,895,464 B2
(45) Date of Patent: May 17, 2005

(54) FLASH MEMORY MANAGEMENT SYSTEM AND METHOD UTILIZING MULTIPLE BLOCK LIST WINDOWS

(75) Inventors: James Chow, Glendale, AZ (US); Thomas K. Gender, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 133 days.

(21) Appl. No.: 10/161,373

(22) Filed: Jun. 3, 2002

(65) Prior Publication Data

US 2003/0225961 A1 Dec. 4, 2003

(51) Int. Cl.[7] ............................................. G06F 12/00
(52) U.S. Cl. .................................. 711/103; 365/185.33
(58) Field of Search ................................. 711/103, 202, 711/170–173; 365/185.33, 185.11

(56) References Cited

U.S. PATENT DOCUMENTS

| | | | |
|---|---|---|---|
| 5,471,604 A | | 11/1995 | Hasbun et al. |
| 5,535,328 A | * | 7/1996 | Harari et al. .................. 714/7 |
| 5,737,742 A | * | 4/1998 | Achiwa et al. ............. 711/103 |
| 5,956,473 A | | 9/1999 | Ma et al. |
| 6,256,642 B1 | * | 7/2001 | Krueger et al. ............. 707/205 |
| 6,336,176 B1 | * | 1/2002 | Leyda et al. ................ 711/170 |
| 6,584,579 B1 | * | 6/2003 | Komatsu et al. ................ 714/7 |
| 6,715,027 B2 | * | 3/2004 | Kim et al. ................... 711/103 |
| 2001/0052093 A1 | * | 12/2001 | Oshima et al. ............. 714/719 |

OTHER PUBLICATIONS

M.-L. Chiang and R.-C. Chang, "Cleaning Policies in Mobile Computers Using Flash Memory," The Journal of Systems and Software, Issue 48, 1999, pp. 213–231.*

An article entitled "Cleaning Policies in Mobile Computers Usin Flash Memory", by Mei–Ling Chiang, Paul C.H. Lee, Ruei–Chuan Chang from Institute of Information Science, Academia Sinica, Taipei, ROC.

(Continued)

*Primary Examiner*—Matthew Kim
*Assistant Examiner*—Shane Thomas

(57) ABSTRACT

The present invention provides a flash memory management system and method with increased performance. The flash memory management system provides the ability to efficiently manage and allocate flash memory use in a way that improves reliability and longevity, while maintaining good performance levels. The flash memory management system includes a free block mechanism, a disk maintenance mechanism, and a bad block detection mechanism. The free block mechanism provides efficient sorting of free blocks to facilitate selecting low use blocks for writing. The disk maintenance mechanism provides for the ability to efficiently clean flash memory blocks during processor idle times. The bad block detection mechanism provides the ability to better detect when a block of flash memory is likely to go bad. The flash status mechanism stores information in fast access memory that describes the content and status of the data in the flash disk. The new bank detection mechanism provides the ability to automatically detect when new banks of flash memory are added to the system. Together, these mechanisms provide a flash memory management system that can improve the operational efficiency of systems that utilize flash memory.

26 Claims, 2 Drawing Sheets

OTHER PUBLICATIONS

An article entitled Data Management In A Flash Memory Based Storage Server by Mei–Ling Chiang, Paul C.H. Lee, and Ruei–Chuan Chang from Institute of Information Science, Academia Sinica, Nankan, Taiwan, ROC.

An article entitled "HiPEC: High Performance External Virtual Memory Catching" by Chao–Hsien Lee, Meng Chang Chen and Rue–Chuan Chang, from Institute of Information Science, Academia Sinica, Taiwan, ROC.

An articl entitled "Flash Memory Management for Lightweight Storage Systems" by Mei–Ling Chiang, Paul c.H. Lee and Ruei–Chuan Change from Department of Computer and Information Science, National Chiao Tung University, Hsinchu, Taiwan, ROC/.

Chiang M–L et al, "Cleaning Policies in Mobile Computers using Flash Memory," Journal of Systems and Software, Nov. 1, 1999, Elsevier, USA, vol. 48, No. 3, pp. 213–231, cited in the application, the whole document.

Mei–Ling Chiang et al, "Data Management in a Flash Memory Based Storage Server," XP002255590, cited in the application, the whole document.

* cited by examiner

FLASH MEMORY MANAGEMENT SYSTEM AND METHOD UTILIZING MULTIPLE BLOCK LIST WINDOWS

STATEMENT OF GOVERNMENT INTEREST

The U.S. Government has a paid-up license in this invention and the right in limited circumstances to require the patent owner to license to others on reasonable terms as provided for by the terms of Contract No. NAS15-10000 awarded by the National Aeronautics and Space Administration (NASA), Boeing Subcontract No. 940S9001.

BACKGROUND OF THE INVENTION

1. Technical Field

This invention generally relates to computer systems, and more specifically relates to flash memory in computer systems.

2. Background Art

Modern life is becoming more dependent upon computers. Computers have evolved into extremely sophisticated devices, and may be found in many different applications. These applications involve everything from application specific computers found in every day devices such as automobiles, phones and other electronics, to the general purpose computers found in the form of PDAs, personal computers, servers and mainframes.

One of the main components in modern computer systems is memory. Many different types of memory products are commonly used in computer systems. Most memory used in computer is volatile, meaning that it requires power to store information. If the power is turned off, the information stored in volatile memory is lost. In certain applications, some memory in the computer system must be able to retain the information even when power is off. For these applications, a non-volatile memory is used to store the information that cannot be lost when the power is turned off.

One common type of non-volatile memory is called flash. Flash memory is used in a wide variety of applications, such as storing control code in computer systems. In flash memory an electric charge is stored on a floating gate in each cell, with the level of the electric charge determining the value for that cell. In flash memory the memory is organized so that a section of memory cells is erased in a single action or "flash". This erase uses tunneling in which electrons pierce through a thin dielectric material to remove the electronic charge from the floating gate associated with each memory cell.

Flash memory has several operational characteristics that introduce difficulties for the software that manages it. For example, flash memory must be erased before it can be written. Additionally, the section size for writes (commonly called a page) is often different than the section size for erasures (commonly called a block). For example, a flash memory system could have a page size of 2 k bytes and thus allow writes at the 2 k increments, but have a block size of 64 k bytes and thus only allow entire 64 k sections to be erased at a time. Another difficulty is that flash memory generally has a restricted lifetime, with a limited number of erases before it fails. Finally, flash memory will in some circumstances fail prematurely.

All of these characteristics of flash memory introduce difficulties in some applications, and must be addressed. Attempts to address these difficulties in the past have led to unacceptable performance degradation.

Thus, what is needed is an improved performance management system for controlling the operation and use of flash memory in computer systems.

DISCLOSURE OF INVENTION

The present invention provides a flash memory management system and method with improved performance. The flash memory management system provides the ability to efficiently manage and allocate flash memory use in a way that improves reliability and longevity, while maintaining good performance levels.

The flash memory management system includes a free block mechanism, a disk maintenance mechanism, and a bad block detection mechanism. The free block mechanism provides efficient sorting of free blocks to facilitate selecting low use blocks for writing. The disk maintenance mechanism provides for the ability to efficiently clean flash memory blocks. The bad block detection mechanism provides the ability to detect when a block of flash memory is likely to go bad. Together, these mechanisms provide a flash memory management system that can improve the operational efficiency of systems that utilize flash memory.

In addition to these mechanisms, additional can be included in the flash memory management system to track flash status and to facilitate new bank detection.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

The present invention provides a flash memory management system and method with increased performance. The flash memory management system provides the ability to efficiently manage and allocate flash memory use in a way that improves reliability and longevity, while maintaining good performance levels.

The flash memory management system includes a free block mechanism, a disk maintenance mechanism, a bad block detection mechanism, a new bank detection mechanism and a flash status mechanism. The free block mechanism provides efficient sorting of free blocks to facilitate selecting low use blocks for writing. The disk maintenance mechanism provides for the ability to efficiently clean flash memory blocks during processor idle times. The bad block detection mechanism provides the ability to detect when a block of flash memory is likely to go bad. The flash status mechanism stores information in fast access memory that describes the content and status of the data in the flash disk. The new bank detection mechanism provides the ability to automatically detect when new banks of flash memory are added to the system. Together, these mechanisms provide a flash memory management system that can improve the operational efficiency of systems that utilize flash memory.

Figure 1:
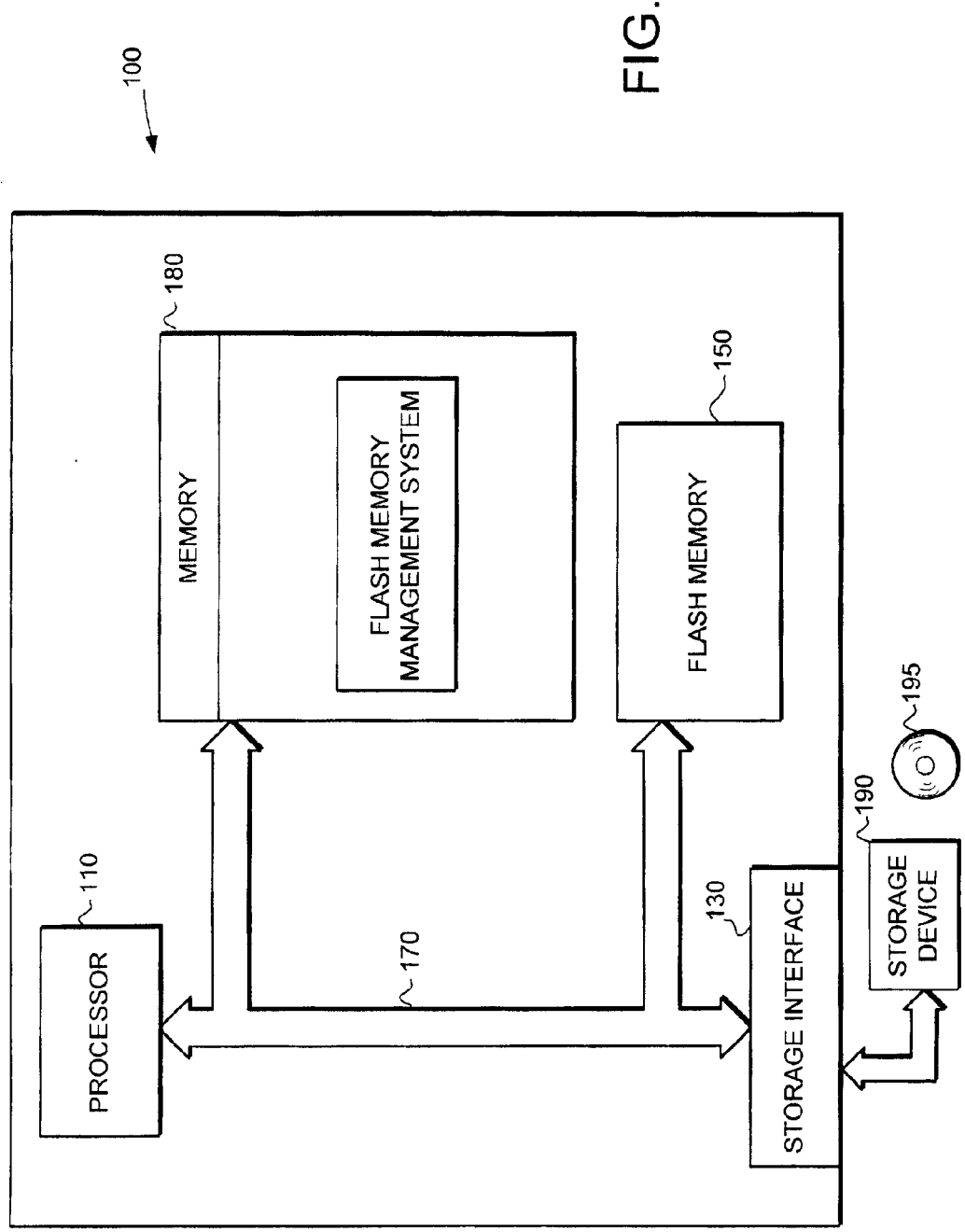
FIG. 1 is a schematic view of a computer system.

Turning now to FIG. 1, an exemplary computer system 100 is illustrated. Computer system 100 illustrates the general features of a computer system that can be used to implement the invention. Of course, these features are merely exemplary, and it should be understood that the invention can be implemented using different types of hardware that can include more or different features. The exemplary computer system 100 includes a processor 110, a storage interface 130, a storage device 190, a bus 170 and a memory 180. In accordance with the preferred embodiments of the invention, the memory system 100 includes a flash memory management system and a flash memory 150.

The processor 110 performs the computation and control functions of the system 100. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate computer systems. During operation, the processor 110 executes the programs contained within memory 180 and as such, controls the general operation of the computer system 100.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 100.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The storage interface 130 represents any method of interfacing a storage apparatus to a computer system. Storage device 160 can be any suitable type of storage apparatus, including direct access storage devices such as hard disk drives, floppy disk drives and optical disk drives. As shown in FIG. 1, storage device 160 can comprise a CD type device that uses optical discs 195 to store data.

In accordance with the preferred embodiments of the invention, the memory system 100 includes a flash memory management system and a flash memory 150. The flash memory management system provides functionality that that can improve the operational efficiency of systems that utilize flash memory 150. Flash memory 150 can comprise any suitable type and combination of flash memory. It should be noted that the preferred implementation of the computer system would typically comprise an embedded system designed as a combination of hardware and software that are integrated together as part of a larger overall system.

It should be understood that while the present invention is described in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

Figure 2:
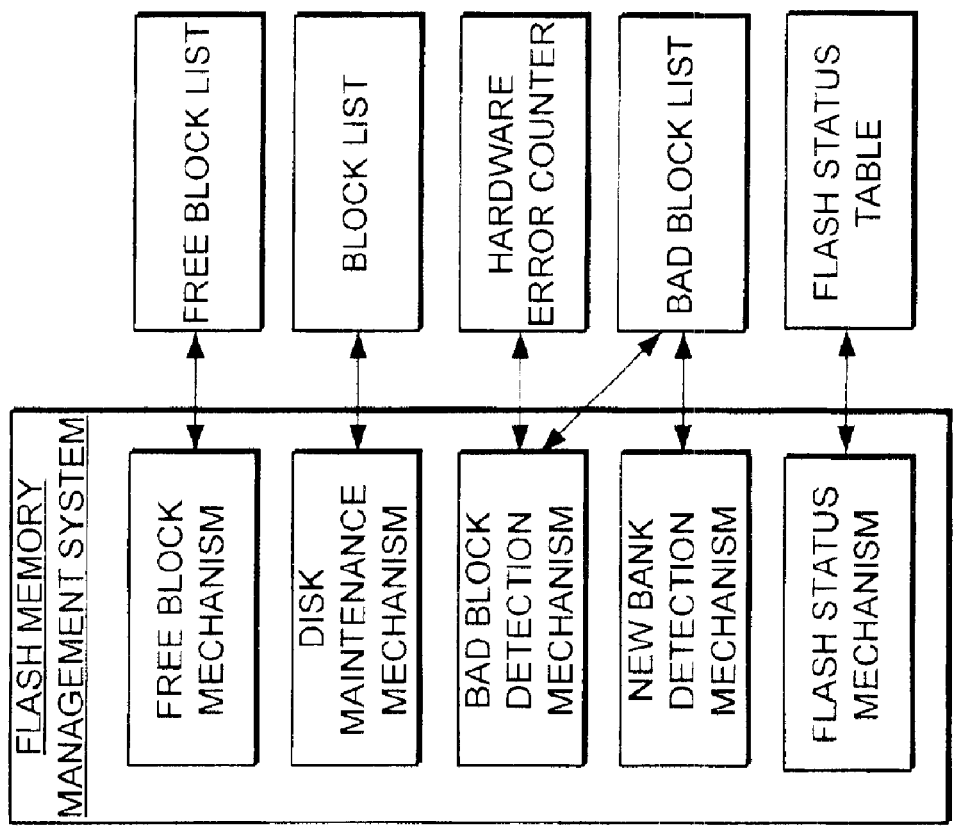
FIG. 2 is a schematic view of a flash memory management system.

Turning now to FIG. 2, the flash memory management system is illustrated in more detail. The flash memory management system includes a free block mechanism, a disk maintenance mechanism, a bad block detection mechanism, a flash status mechanism and a new bank detection mechanism. The free block mechanism provides efficient sorting of free blocks to facilitate selecting low use blocks for writing. The disk maintenance mechanism provides for the ability to efficiently clean flash memory blocks during processor idle times. The bad block detection mechanism provides the ability to detect when a block of flash memory is likely to go bad. The flash status mechanism stores information in fast access memory that describes the content and status of the data in the flash disk. The new bank detection mechanism provides the ability to automatically detect when new banks of flash memory are added to the system. Together, these mechanisms provide a flash memory management system that can improve the operational efficiency of systems that utilize flash memory.

The free block mechanism provides efficient sorting of free blocks. Flash memory has a restricted lifetime with a limited number of erasures and writes possible before the memory starts to fail. Because of this, it is important to equalize the usage of blocks to maximize the average lifetime. To accomplish this the free block mechanism manages a free block list that comprises an unsorted list of physical blocks that have been erased and are ready to write. These blocks are candidates for selection when the user application requests a write operation. When a user block is erased, it is added to the end of the free block list.

The free block mechanism selects blocks from the free block list based on the erase count. Selecting the memory block that has the smallest erase count will optimize wear leveling among all memory blocks. So, although the free block list is unsorted and remains so, for any block request the smallest erase count block will be returned for a given window size.

In order to facilitate efficient searching through the free block list, the free block mechanism implements a windowed search routine. The windowed search routine defines a portion of the free block list that will be searched. The search routine then searches the window portion of the free block list for the flash memory block with the lowest erase count. Because only the portion of the free block list in the window is searched for any given search request, the performance of the search is improved.

The free block mechanism adjusts the location of the window in the free block list between searches. This allows the entire free block list to be covered over time, and promotes efficient wear leveling.

The size of the window used by the free block mechanism can be adjusted to optimize the number of blocks searched, based on real-time performance constraints. The larger the window, the larger the number of free blocks that are examined during each search. The smaller the window, the faster the search can be performed. Thus, by adjusting the size of the window the free block mechanism can balance the need for performance with the need for wear leveling of the memory blocks.

The disk maintenance mechanism provides for the ability to efficiently clean flash memory blocks during processor idle times. In flash memory, the section size for writes (commonly called a page) is often different than the section size for erasures (commonly called a block). For example, a flash memory system could have a page size of 2 k bytes and thus allow writes at the 2 k increments, but have a block size of 64 k bytes and thus only allow entire 64 k sections to be erased at a time. Because flash memory has a restricted lifetime, with a limited number of erasures possible before the memory starts to fail, it is important to minimize the number of erasures that a block of flash memory is subjected to. In particular, it is important to write and erase blocks approximately equally, so that overall wear is distributed across all the blocks.

The disk maintenance mechanism provides wear leveling in an efficient manner that can provide high performance results. To facilitate this, the disk maintenance mechanism utilizes a block list. The block list is an ordered list of all non-defective, user blocks in the system. The blocks in the block list are those that are available for use by the user of the flash memory management system. This list is essentially static, with changes occurring only when a block is removed because it has become defective.

To determine when flash blocks are to be erased, the disk maintenance mechanism implements a windowed scan of blocks in the block list using a Cost Age Times (CAT) formula. Of course, other suitable algorithms such as the known Greedy algorithm and Cost-Benefit algorithm could also be used. See "Data Management in a Flash Memory Based Storage Server", by Mei-Ling Chiang, Paul C. H. Lee, and Ruei-Chuan Chang.

When all the pages in a flash block have been written, the block cannot be written again until it is erased. As pages of data are updated by the user, their previous flash locations become obsolete. When a significant number of pages in a block become obsolete, the block becomes a candidate for cleaning. In particular, the CAT formula is used to evaluate the block for cleaning. If the block meets the CAT criteria, the block is erased and added to the free block list. If any valid data remains in the block, that data is first migrated to another block before erasure. The CAT algorithm ensures that a sufficient number of blocks are available on the free block list to guarantee that any write request can be satisfied.

An example of a CAT formula suitable for using in determining flash memory erasure is found in "Cleaning Policies in Mobile Computers Using Flash Memory", by Mei-Ling Chiang, Paul C. H. Lee, and Ruei-Chaun Chang. The CAT formula selects the blocks to be erased based on the number of valid pages in the block, the age of the data in the block, and the number of times the block has been erased. The windowed scan defines a portion of the blocks in the block list that will be evaluated for erasure using the CAT formula. The CAT formula is used to evaluate those blocks in the window for erasure. Only the portion of the blocks in the window are evaluated each time, and the performance of the CAT evaluation is thus improved.

The disk maintenance mechanism adjusts the location of the window between evaluations. This allows the window to be moved over the entire list of blocks, again promoting efficient wear leveling.

The size of the window used by the disk maintenance mechanism can be adjusted to optimize the number of blocks evaluated during the time available for the evaluation. The larger the window, the larger number of blocks that can be evaluated each time. The smaller the window, the faster the evaluation can be performed. Thus, by adjusting the size of the window the disk maintenance mechanism can balance the need for performance with the need for wear leveling of the memory blocks.

The disk maintenance mechanism can be used to evaluate blocks for cleaning and data migration in the background, during processor idle times. Performing disk maintenance in the background allows for a more complete evaluation of block usage. Additionally, it allows valid user data to be selectively migrated from blocks that are substantially full of invalid data, such that the block can then be erased.

The bad block detection mechanism is used to determine that a block is likely to fail, so that it can be removed from service before failure is complete. In normal flash memory operation, a small percentage of flash blocks will generally fail. The bad block detection mechanism detects when a block is failing, and moves any valid data in the block to a new block. The bad block detection mechanism maintains a list of all defective blocks, and adds failing blocks to the bad block list when they are detected. A separate bad block list can be maintained for each flash bank in the system. When a block is determined to be defective, it is added to the bad block list, thus it is no longer available to be used.

The bad block detection mechanism monitors for failing blocks by examining detected errors in the flash memory system differentiating those errors that result from other causes. The bad block detection mechanism uses a weighted formula to evaluate whether observed errors are indicative of a failing block of memory.

The preferred implementation of the detection mechanism examines errors that are recorded by an Error Detection and Correction (EDAC) system and certain error statuses on writes and erases. These errors can include correctable EDAC errors observed when reading a page, uncorrectable EDAC errors while reading a page, flash device errors (FDE) while writing a page, and any error that occurs while erasing a block.

Of these errors, only an uncorrectable EDAC error during a read would generally result in the loss of user data. The other three errors are either correctable, or occur before data is considered to have been successfully written. However, all of these errors can indicate a failing block. The bad block detection mechanism tracks these errors to predict when a block will fail, before an uncorrectable EDAC error occurs on a read event.

The bad block detection mechanism distinguishes between events that are indicative of a failing block and other failures such as transient errors. Transient errors are those errors that are temporary in nature, such as errors created by spurious electrical activity. In these transient errors, subsequent access of the flash memory block will result in normal behavior. For example, in devices designed for use in space and other ionizing environments, radiation hardening of flash devices protects the devices from permanent damage due to radiation. However, in these devices radiation can cause transient errors such as Single Event Upsets (SEU). SEU errors do not represent a failure of a flash block because they do not occur in the radiation hardened flash devices, but rather in the unprotected flash data and status registers. Thus, hardware errors resulting from SEUs should not cause a block to be mapped out as defective. The bad block detection mechanism must balance between tolerating a reasonable number of transient errors such as SEUs while not allowing too many non-transient errors to occur without determining that the block is bad.

To implement this, the bad block detection mechanism determines that blocks are bad when a variety of conditions are met. For example, in one implementation a block is determined to be bad when errors following two consecutive block erases occur. For example, when both the initial try and retry result in an error. The multiple errors exclude a transient error as the likely cause of the errors.

In another implementation, a hardware error counter is maintained for each flash block to keep a combined count of flash read and write errors. When the hardware error counter reaches a certain threshold, the block is considered defective and all valid data is migrated. In one example, correctable EDAC errors increment the hardware error counter by one, and uncorrectable EDAC errors by two. FDE errors increment the hardware error counter by two. As an example, the threshold is set to four. Thus, four correctable errors, or two uncorrectable errors, or one uncorrectable and two correctable errors, or one uncorrectable error and one FDE, can occur before the block is considered bad. Using such a weighted evaluation of errors provides early detection of failing blocks while providing adequate tolerance for SEUs.

The flash status mechanism stores information in a flash status table that describes the content and status of the data in the flash disk. The flash status table is a data structure that describes the status of each flash block in the system. The purpose of the table is to enable quick access of flash information stored in RAM, rather than reading it from the slower flash memory. The table can be populated during system startup by scanning all flash pages in the system. The table can be updated as new flash pages are written and erased during system operation. It can contain such information as the blocks use (e.g., system or user), defective status, hardware error count, data clustering region to which the block is assigned, next free page in the block, number of invalid pages in the block, which pages contain valid data, and the block's erase count and age.

The information in the flash status table is used by the free block mechanism to facilitate wear leveling. Likewise, the background disk maintenance mechanism accesses this table to determine which blocks to erase and to build a sorted list of which blocks are ready to write.

The new bank detection mechanism provides the ability to automatically detect when new banks of flash memory are added to the system. The new bank detection mechanism scans new banks for bad blocks that were detected during manufacturing and adds those bad blocks to the bad block list. The new bank is integrated into the system by adding its new blocks to the free block list and making its pages available for writing.

When a new flash bank is detected in the system, a bad block list is created for this bank to keep track of the bad blocks from the factory. This bad block list is read during system startup and updated during normal operation as other blocks go bad. The bad block list informs the system which blocks are usable and which blocks should not be used for storing data. Thus, the new bank detection mechanism can automatically detect a new bank and generate the necessary system structures to support access of this new bank. The presence of this feature avoids the need to execute a special test program to process newly installed flash banks.

The present invention thus provides a flash memory management system and method with increased improved performance. The flash memory management system provides the ability to efficiently manage and allocate flash memory use in a way that improves reliability and longevity, while maintaining good performance levels.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An apparatus comprising:
 a) a processor;
 b) a memory coupled to the processor;
 c) a flash memory management system residing in the memory and being executed by the processor, the flash memory management system including:
  a free block mechanism for locating free blocks of flash memory for writing, the free block mechanism including a free block list of flash memory blocks, and further including a free block list window defining a subset plurality of the flash memory blocks in the free block list, the free block mechanism searching the subset plurality of flash memory blocks in the free block list for a flash memory block having a lowest erase count of flash memory blocks in the subset plurality of flash memory blocks in the free block list;
  a disk maintenance mechanism for locating blocks of flash memory for cleaning, the disk maintenance mechanism including a block list of flash memory blocks, and further including a block list window defining a subset plurality of flash memory blocks in the block list, the disk maintenance mechanism evaluating the subset plurality of flash memory blocks in the block list to determine if any flash memory blocks in the subset plurality of flash memory blocks in the block list are candidates for cleaning.

2. The apparatus of claim 1 wherein the free block mechanism further moves the free block list window to a different location on the free block list to select a different subset plurality of flash memory blocks in the free block list for searching of the different subset plurality of flash memory blocks in the free block list.

3. The apparatus of claim 1 wherein the disk maintenance mechanism further moves the block list window to a different location on the block list to select a different subset plurality of flash memory blocks in the block list for evaluating the different subset plurality of flash memory blocks in the block list.

4. The apparatus of claim 1 wherein the free block mechanism adjusts the size of the free block list window to change a number of flash memory blocks searched according to performance requirements.

5. The apparatus of claim 1 wherein the disk maintenance mechanism evaluates the portion of the flash memory blocks in the block list window using a cost age times formula.

6. The apparatus of claim 1 wherein the flash memory management system further comprises a new bank detection mechanism for determining when a new bank of flash memory has been added, the new bank detection mechanism adding blocks from the new banks to the block list and the free block list.

7. The apparatus of claim 1 wherein the flash memory management system further comprises a flash status mechanism, the flash status mechanism storing status information in the memory on startup of the flash memory management system.

8. The apparatus of claim 1 wherein the flash memory management system further comprises a bad block detection mechanism for locating blocks of flash memory likely to become bad, the bad block detection mechanism monitoring the flash memory blocks for error activity and designating a block as bad when the error activity rises above a predefined threshold.

9. A method for managing a flash memory system comprising a plurality of flash memory blocks, the method comprising the steps of:
   a) locating free blocks of the flash memory for writing by defining a free block list of flash memory blocks and defining a free block list window defining a subset plurality of the flash memory blocks in the free black list, and by searching the subset plurality of the flash memory blocks in the free block list for a flash memory block having a lowest erase count of flash memory blocks in the subset plurality of flash memory blocks in the free block list;
   b) locating blocks of the flash memory for cleaning by defining a block list of flash memory blocks and defining a block list window defining a subset plurality of the flash memory blocks in the block list, and by evaluating the subset plurality of the flash memory blocks in the block list to determine if any flash memory blocks in the subset plurality of flash memory blocks in the block list are candidates for cleaning.

10. The method of claim 9 further comprising the step of moving the free block list window to a different location on the free block list to select a different subset plurality of flash memory blocks in the free block list and searching a portion of the flash memory blocks defined by the free block list window in the different location.

11. The method of claim 9 further comprising the step of moving the block list window to a different location on the free block list to select a different subset plurality of flash memory blocks in the block list and evaluating a portion of the flash memory blocks defined by the block list window in the different location.

12. The method of claim 9 further comprising the step of adjusting the size of the free block list window to change a number of flash memory blocks searched according to performance requirements.

13. The method of claim 9 wherein the step of locating blocks of flash memory likely to become bad comprises evaluating the portion of the flash memory blocks in the block list window using a cost age times formula.

14. The method of claim 9 further comprising the step of determining when a new bank of flash memory has been added.

15. The method of claim 9 further comprising the step of storing status information on startup of the flash memory system.

16. The method of claim 9 further comprising the step of locating blocks of flash memory likely to become bad by monitoring the flash memory blocks for error activity and designating a block as bad when the error activity rises above a predefined threshold.

17. A program product comprising:
   a) a flash memory management program, the flash memory management program including:
      a free block mechanism for locating free blocks of flash memory for writing, the free block mechanism including a free block list of flash memory blocks, and further including a free block list window defining a subset plurality of the flash memory blocks in the free block list, the free block mechanism searching the subset plurality of flash memory blocks in a free block list for a flash memory block having a lowest erase count of flash memory blocks in the subset plurality of flash memory blocks in the free block list;
      a disk maintenance mechanism for locating blocks of flash memory for cleaning, the disk maintenance mechanism including a block list of flash memory blocks, and further including a block list window defining a subset plurality of the flash memory blocks in the block list, the disk maintenance mechanism evaluating the subset plurality of flash memory blocks in a block list to determine if any flash memory blocks in the subset plurality of flash memory blocks in the block list are candidates for cleaning;
   b) a computer-readable signal bearing media bearing said program.

18. The program product of claim 17 wherein said signal bearing media comprises recordable media.

19. The program product of claim 17 wherein said signal bearing media comprises transmission media.

20. The program product of claim 17 wherein the free block mechanism further moves the free block list window to a different location on the free block list to select a different subset plurality of flash memory blocks in the free block list for searching of the different subset plurality of flash memory blocks in the free block list.

21. The program product of claim 17 wherein the disk maintenance mechanism further moves the block list window to a different location on the block list to select a different subset plurality of flash memory blocks in the block list for evaluating the different subset plurality of flash memory blocks in the block list.

22. The program product of claim 17 wherein the free block mechanism adjusts the size of the free block list window to change a number of flash memory blocks searched according to performance requirements.

23. The program product of claim 17 wherein the disk maintenance mechanism evaluates the portion of the flash memory blocks in the block list window using a cost age times formula.

24. The program product of claim 17 wherein the flash memory management program further comprises a new bank detection mechanism for determining when a new bank of flash memory has been added, the new bank detection mechanism adding blocks from the new banks to the block list and the free block list.

25. The program product of claim 17 wherein the flash memory management program further comprises a flash status mechanism, the flash status mechanism storing status information in a random access memory on startup of the flash memory program.

26. The program product of claim 17 wherein the flash memory management program further comprises a bad block detection mechanism for locating blocks of flash memory likely to become bad, the bad block detection mechanism monitoring the flash memory blocks for error activity and designating a block as bad when the error activity rises above a predefined threshold.

* * * * *